United States Patent
Fisher et al.

(10) Patent No.: US 10,800,578 B2
(45) Date of Patent: Oct. 13, 2020

(54) INTERNAL THREADED TUBE

(71) Applicant: KAO USA INC., Cincinnati, OH (US)

(72) Inventors: Matthew Fisher, Cincinnati, OH (US); Ken Adams, Fairfield, OH (US)

(73) Assignee: KAO USA INC., Cincinnati, OH (US)

( * ) Notice: Subject to any disclaimer, the term of this patent is extended or adjusted under 35 U.S.C. 154(b) by 861 days.

(21) Appl. No.: 15/045,534

(22) Filed: Feb. 17, 2016

(65) Prior Publication Data

US 2016/0236827 A1    Aug. 18, 2016

Related U.S. Application Data

(60) Provisional application No. 62/117,589, filed on Feb. 18, 2015.

(51) Int. Cl.
| | |
|---|---|
| *B65D 35/00* | (2006.01) |
| *B65D 35/08* | (2006.01) |
| *B65D 35/44* | (2006.01) |
| *B65D 41/04* | (2006.01) |
| *B29C 45/00* | (2006.01) |
| *B65D 39/08* | (2006.01) |
| *B29C 45/26* | (2006.01) |
| *B65D 47/08* | (2006.01) |

(52) U.S. Cl.
CPC .......... *B65D 35/08* (2013.01); *B29C 45/0053* (2013.01); *B29C 45/2618* (2013.01); *B65D 35/44* (2013.01); *B65D 39/08* (2013.01); *B65D 41/04* (2013.01); *B29C 45/2622* (2013.01); *B65D 47/08* (2013.01)

(58) Field of Classification Search
CPC ........ B65D 35/00; B65D 35/08; B65D 35/44; B65D 41/04; B65D 45/00; B65D 47/0804; B65D 47/0885
See application file for complete search history.

(56) References Cited

U.S. PATENT DOCUMENTS

| | | | |
|---|---|---|---|
| 560,984 A | * | 5/1896 | Funk |
| 2,269,661 A | * | 1/1942 | Gurwick ................ B65D 35/02 222/107 |

(Continued)

FOREIGN PATENT DOCUMENTS

| | | |
|---|---|---|
| DE | 203 14 295 U1 | 12/2003 |
| WO | WO 2009/134132 A1 | 11/2009 |
| WO | WO 2012/083466 A1 | 6/2012 |

OTHER PUBLICATIONS

European Communication, Intention to Grant, dated Oct. 2, 2018 for Application No. EP 16710528.7, 33 pgs.

(Continued)

*Primary Examiner* — Anthony D Stashick
*Assistant Examiner* — Blaine G Neway
(74) *Attorney, Agent, or Firm* — Frost Brown Todd LLC (57) ABSTRACT

A tube for dispensing product includes a closed first end, an open second end opposing the closed first end, and a side wall extending between the closed first end and the open second end. The side wall and the closed first end define an interior portion to hold product. The side wall of the tube includes internal threads extending inwardly from the side wall adjacent to the open second end. The various elements of the tube may include interlocking features to seal the tube from outside fluids.

17 Claims, 10 Drawing Sheets

(56) References Cited

U.S. PATENT DOCUMENTS

| | | | | |
|---|---|---|---|---|
| 4,377,248 A * | 3/1983 | Stull | B65D 47/148 | 215/306 |
| 4,690,670 A * | 9/1987 | Nielsen | B04B 5/0414 | 215/276 |
| 5,271,524 A * | 12/1993 | Marston | B65D 50/06 | 222/1 |
| 5,505,342 A * | 4/1996 | Okamura | B65D 83/0055 | 222/212 |
| 5,680,946 A * | 10/1997 | Cochran | B65D 41/18 | 215/317 |
| 6,102,225 A * | 8/2000 | Lynn | B65D 1/0246 | 215/252 |
| 8,783,515 B2 * | 7/2014 | Branyon | B31C 1/04 | 215/44 |
| 9,090,385 B2 * | 7/2015 | Blagojevic | B65D 53/00 | |
| 2005/0051508 A1 * | 3/2005 | Hackmann | B65D 41/0414 | 215/343 |

OTHER PUBLICATIONS

International Search Report and Written Opinion dated Aug. 1, 2016 for Application No. PCT/US2016/018269, 18 pgs.

* cited by examiner

INTERNAL THREADED TUBE

BACKGROUND

A product package that is squeezable to dispense product from the package, such as a tube, is known in the art. Tubes may be used to dispense a variety of products, including personal care products such as shampoo, conditioner, lotion, soap, hair color, toothpaste, gels, etc. Typically, finished tubes are produced by welding an injection or compression molded tube head on an extruded tube. Tube heads are designed to allow for attachment of a threaded or snap-on closure. A threaded closure attaches via external threads on the tube head so the closure is in contact with the tube.

It is desirable for the closure to be better sealed with the body of the tube to reduce and/or prevent water from entering the closure. A common complaint of consumers using tubes with closures attached to tube heads via external threads is the experience of a spurt of cold water when using the tube in a shower or bath setting.

Tubes manufactured using extrusion molding processes are cylindrical in shape. After filling and sealing, the sealed end of the tube flares out producing a shape that is visually unappealing.

There exists the need for a tube that does not require a tube head and allows for direct attachment of the closure to the tube. Furthermore, there is a need to allow the consumer to easily remove the closure to easily access the remaining product in the tube. Moreover, there exists the need for a tube to be manufactured via an injection molding process that allows for direct attachment of a closure. It may also be desirable for the package to be straight-sided to provide a visual appeal for consumers. As such, there is a need for improved squeezable tube-type product packages that are better sealed and visually appealing for consumers.

BRIEF DESCRIPTION OF THE DRAWINGS

While the specification concludes with claims which particularly point out and distinctly claim the invention, it is believed the present invention will be better understood from the following description of certain embodiments taken in conjunction with the accompanying drawings, in which like reference numerals identify the same elements.

The drawings are not intended to be limiting in any way, and it is contemplated that various embodiments of the invention may be carried out in a variety of other ways, including those not necessarily depicted in the drawings. The accompanying drawings incorporated in and forming a part of the specification illustrate several aspects of the present invention, and together with the description serve to explain the principles of the invention; it being understood, however, that this invention is not limited to the precise arrangements shown.

DETAILED DESCRIPTION

The following description of certain embodiments of the present disclosure should not be used to limit the scope of the present disclosure. Other examples, features, aspects, embodiments, and advantages of the invention will become apparent to those skilled in the art from the following description. As will be realized, various aspects of the present disclosure may take alternate forms, or have alternate or additional embodiments, without departing from the scope of the present disclosure. Accordingly, the drawings and descriptions should be regarded as illustrative in nature and not restrictive.

Figure 1:
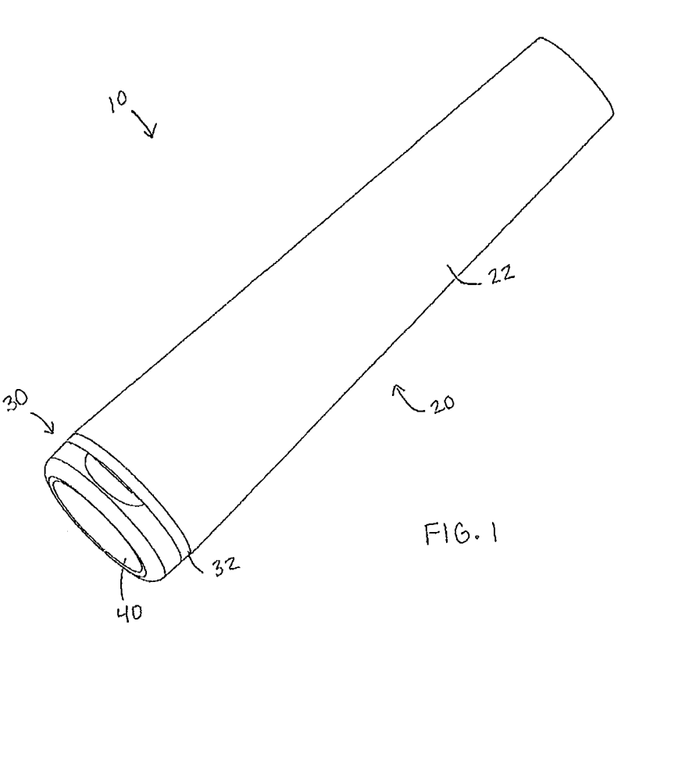
FIG. 1 depicts a bottom perspective view of an internal threaded tube assembly.
Figure 2:
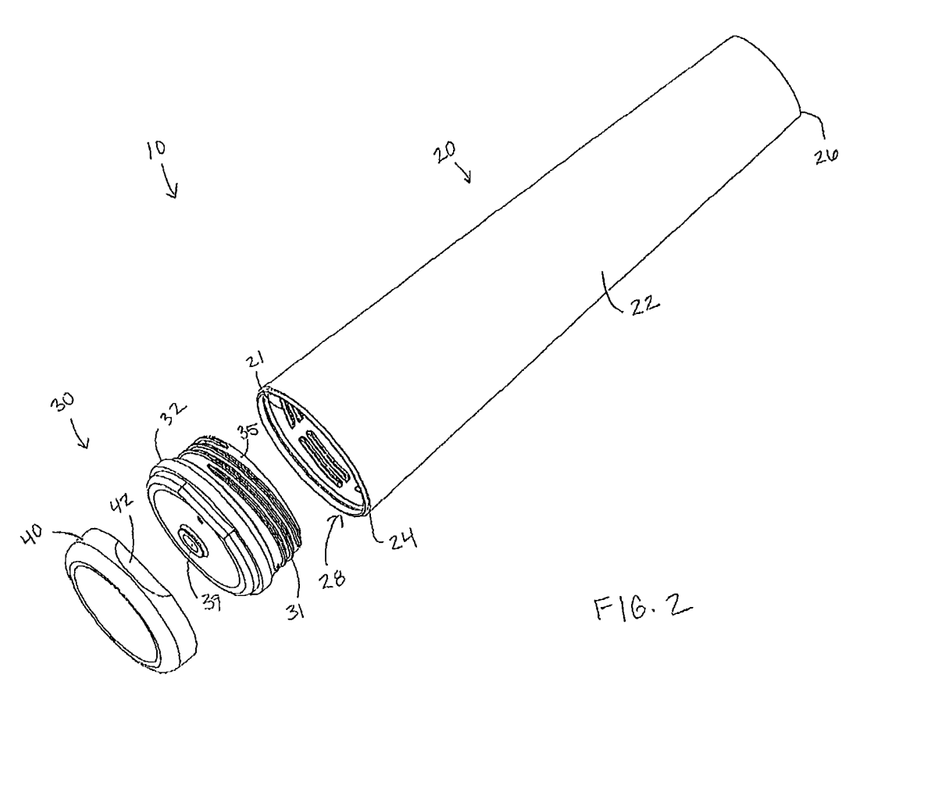
FIG. 2 depicts an exploded perspective view of the tube assembly of FIG. 1.

FIGS. 1 and 2 show a tube assembly (10) comprising a tube (20) and a closure assembly (30) coupled with tube (20). Tube (20) includes a side wall (22) and an opening (28) that extends through side wall (22) from a bottom end (24) to a top end (26) of tube (20). Side wall (22) and top end (26) define an interior portion of tube (20) that is thereby configured to hold product, such as hair care and/or skin care products, within side wall (22). The interior side of side wall (22) includes threads (21) to receive closure assembly (30), which will be discussed in more detail below. As best seen in FIG. 2, closure assembly (30) comprises a closure (32) and a cap (40). Closure (32) includes threads (31) on the exterior side of a neck (35) that correspond to threads (21) of tube (20). As such, closure (32) may be selectively coupled with tube (20) by threading closure (32) into tube (20). Closure (32) further defines an opening (39) in communication with opening (28) of tube (20). This allows the product to be dispensed from the interior portion of tube (20) through opening (39) of closure (32).

Figure 3:
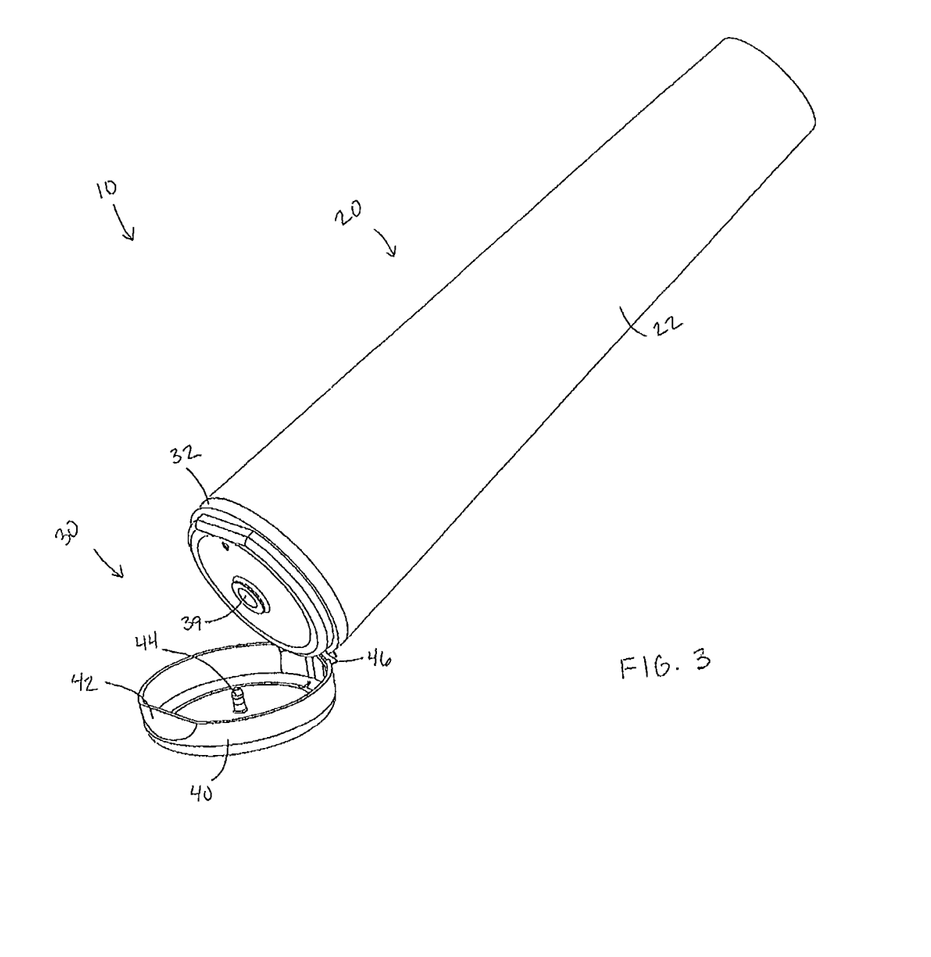
FIG. 3 depicts a bottom perspective view of the tube assembly of FIG. 1, showing a closure assembly in an open position.

Cap (40) of closure assembly (30) is coupled with closure (32) by hinge (46), as shown in FIG. 3, to allow cap (40) to pivot relative to closure (32). Cap (40) further includes a chamfered edge (42) on an opposing side from hinge (46) to allow a consumer to grip chamfered edge (42) to more easily pivot cap (40). A plug (44) extends inwardly within cap (40) and is aligned with opening (39) of closure (32). Accordingly, when cap (40) is in the closed position, as shown in FIG. 1, plug (44) of cap (40) inserts within opening (39) of closure (32) to selectively seal closure (32) and prevent product from exiting through closure (32). With cap (40) in the closed position, tube assembly (10) of the present embodiment is configured to stand upright on cap (40). When cap (40) is pivoted away from closure (32) to the open position, as shown in FIG. 3, plug (44) of cap (40) is removed from opening (39) of closure (32) to allow product to be dispensed from tube (20). Cap (40) may then be pivoted back toward closure (32) to reclose closure (32). This may prevent accidental spilling of the product from closure (32).

It should be noted that plug (44) is merely optional such that cap (40) may cover opening (39) to close closure (32) without being inserted within opening (39). In the present embodiment, cap (40) is coupled with closure (32) via a snap fit, but other suitable configurations for closure assembly (30) will be apparent to one with ordinary skill in the art in view of the teachings herein. For instance, in other embodiments, cap (40) may be threaded onto closure (32) and/or cap (40) may be selectively removable from closure (32). In still other embodiments, cap (40) and/or closure (32) may be a pump. In still other embodiments, cap (40) comprises threads (31) to thread cap (40) directly into tube (20) without closure (32) such that product is dispensed from tube assembly (10) through opening (28) of tube (20).

Figure 4:
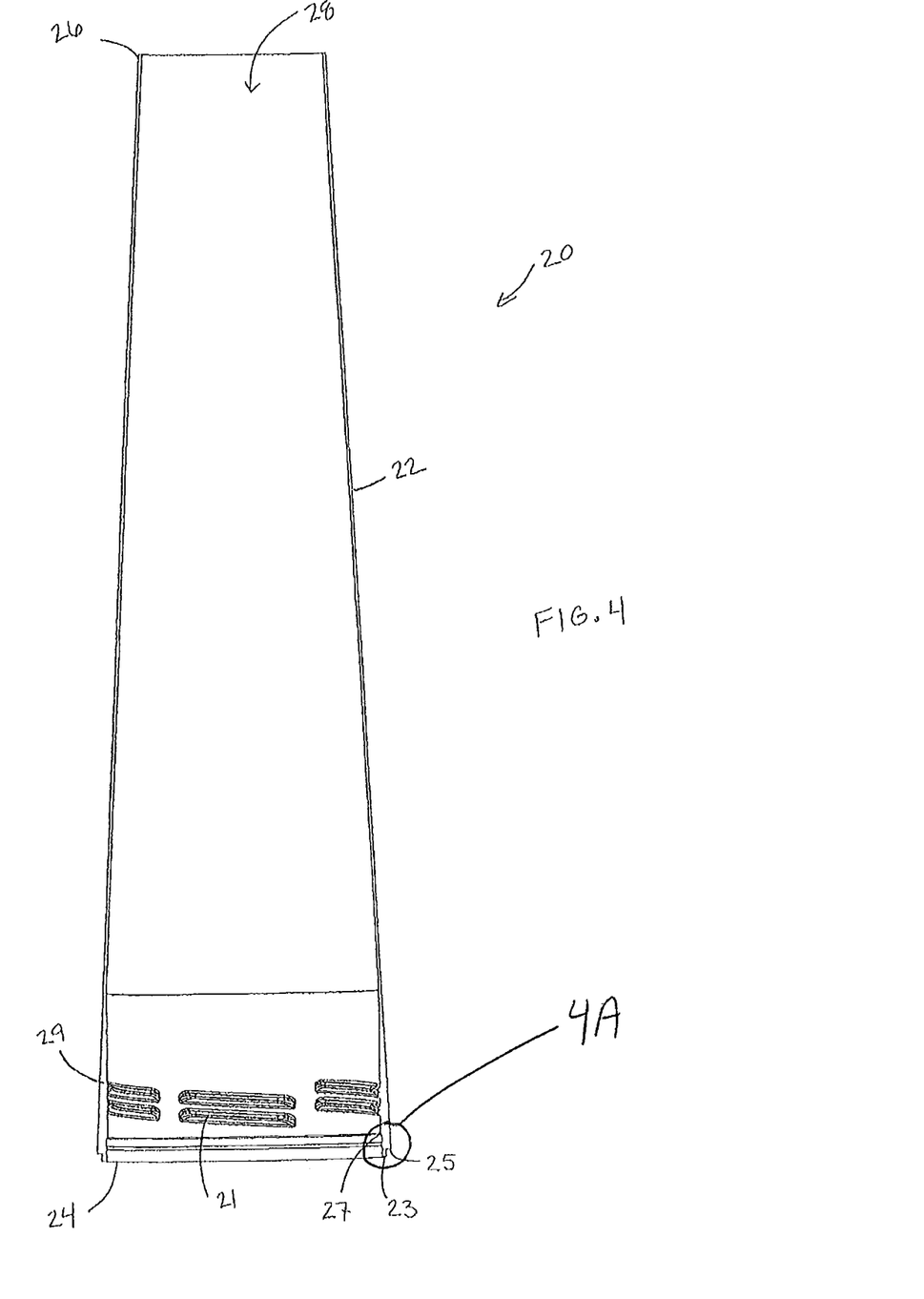
FIG. 4 depicts a cross-sectional view of a tube of the tube assembly of FIG. 1.
Figure 4A:
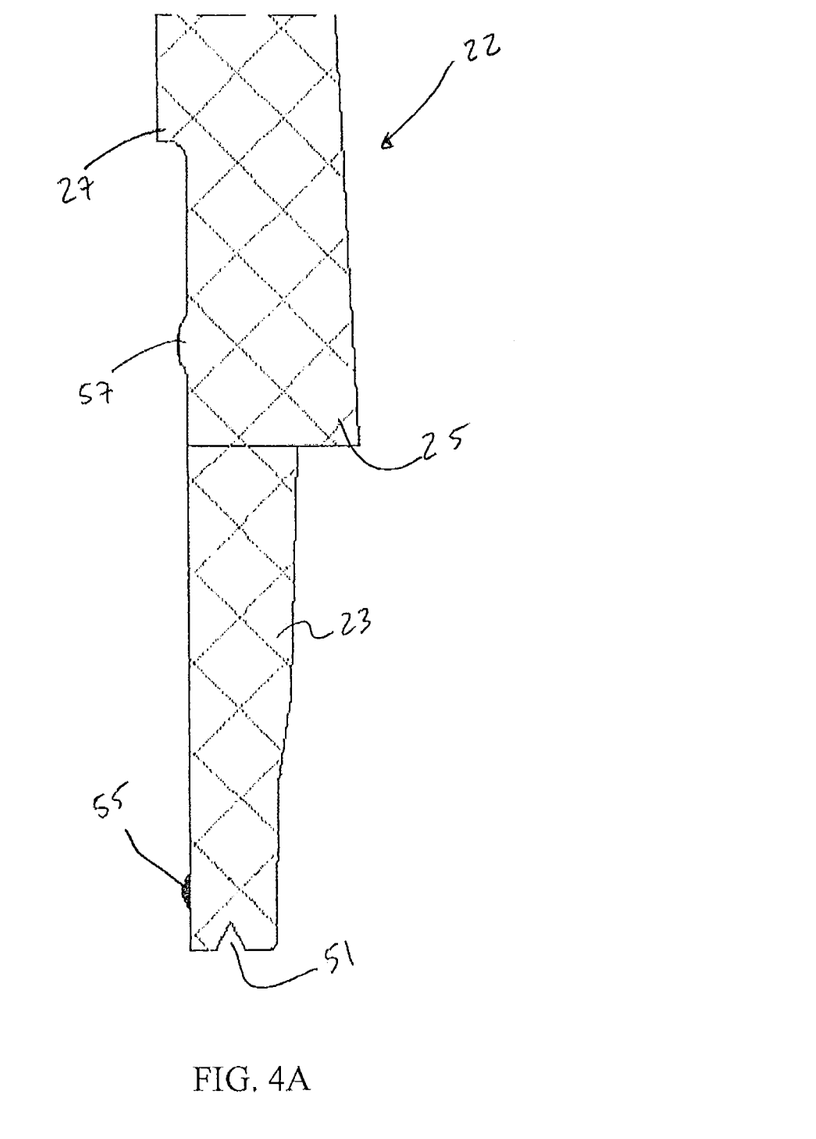
FIG. 4A depicts an enlarged view of an indicated portion of FIG. 1.

Referring to FIG. 4, tube (20) comprises a closure receiving portion (29) near bottom end (24) to receive closure assembly (30). Closure receiving portion (29) comprises threads (21) positioned on the internal portion of side wall (22). In the present embodiment, two rows of six threads (21) are used to couple closure assembly (30) with tube (20). Threads (21) thereby serve as points of contact with closure assembly (30) to keep the interaction between threads (21) and closure assembly (30) as tight as possible. Of course, any other suitable number of rows and/or threads (21) may be used. Closure receiving portion (29) further includes interlocking features comprising an inner annular flange (27), an outer annular flange (25), and an interlocking annular protrusion (23) extending from bottom end (24) of tube (20). Protrusion (23) may have a width of about 0.8 mm and a length of between about 1.5 mm and about 2 mm from bottom end (24), but other suitable dimensions for protrusion (23) will be apparent to one with ordinary skill in the art in view of the teachings herein. As shown in FIG. 4A, protrusion (23) may define a v-lock recess (51) for use alone in sealing tube (20), or optionally receiving a complementary shaped v-lock projection (53) (FIGS. 7A and 7B) disposed on closure (32). Protrusion (23) may also include a first annular bead (55) and a spaced apart second annular bead (57). First annular bead (55) and second annular bead (57) both project inwardly from the inner surface of sidewall (22). First annular bead (55) is located proximate the outermost distal area of projection (23) and second annular bead (57) is located generally proximate annular flange (27). These interlocking features correspond to interlocking features of closure assembly (30) to seal tube assembly (10) to thereby reduce and/or prevent water from entering tube assembly (10). This will be discussed in more detail below.

In the present embodiment, tube (20) is injection molded as a single piece. This may reduce costs by eliminating a step of welding a shoulder onto tube (20). Tube (20) may be formed from polypropylene, polyethylene, thermoplastic elastomers, or other suitable materials that provide sufficient flexibility to allow tube (20) to compress to dispense the product from the interior portion of tube (20), while providing sufficient rigidity to allow tube (20) to stand erect. Tube (20) may be resilient to allow tube (20) to return to its original shape after being compressed, or tube (20) may remain in the compressed state. Side wall (22) of tube (20) may be between about 0.2 mm and about 3.0 mm thick, such as about between about 1.7 mm and about 2.98 mm thick, but other suitable dimensions will be apparent to one with ordinary skill in the art in view of the teachings herein. For example, the thickness of side wall (22) may depend on the properties, such as the flexibility, of the material from which the wall is made.

As seen in FIG. 4, side wall (22) of tube (20) widens in closure receiving portion (29) to accommodate interlocking features (23, 25, 27). This may strengthen closure receiving portion (29) to prevent tube (20) from bending or moving away from closure assembly (30). This may prevent water from entering tube assembly (10). For instance, side wall (22) of tube (20) may widen to a thickness of about 1.7 mm to about 2.98 mm in closure receiving portion (29), but other suitable dimensions may be used. While side wall (22) of tube (20) is shown as widening in closure receiving portion (29), side wall (22) may also have a uniform thickness along the length of side wall (22). Still other configurations for side wall (22) will be apparent to one with ordinary skill in the art in view of the teachings herein.

For instance, FIG. 4 further illustrates tube (20) as having a conical shape such that tube (20) decreases in diameter along the length of tube (20) from bottom end (24) to top end (26). This allows tube (20) to have straight sides when top end (26) is sealed (FIG. 9) to close top end (26), which will be discussed in more detail below. Accordingly, because tube (20) is injection molded as one piece, tube (20) may have varying diameters along the length of tube (20). In the present embodiment, tube (20) has a diameter of about 55 mm at bottom end (24) and a length of about 205 mm, but other suitable dimensions for tube (20) may be used. While tube (20) is shown in the illustrated embodiment as including a circular cross-section, other suitable shapes may be used for tube (20), such as a square, rectangle, triangle, oval, octagon, ellipse, etc. Tube (20) may further be formed from any suitable number of pieces that are injection molded separately and then secured together. Still other suitable configuration for tube (20) will be apparent to one with ordinary skill in the art in view of the teachings herein.

Figure 5:
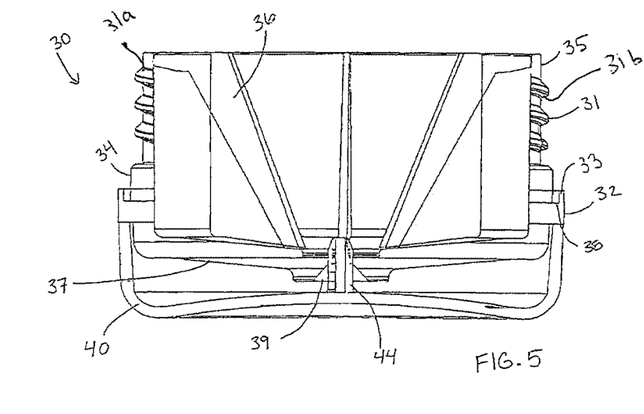
FIG. 5 depicts a cross-sectional view of the closure assembly of the tube assembly of FIG. 1 in a closed position.
Figure 6:
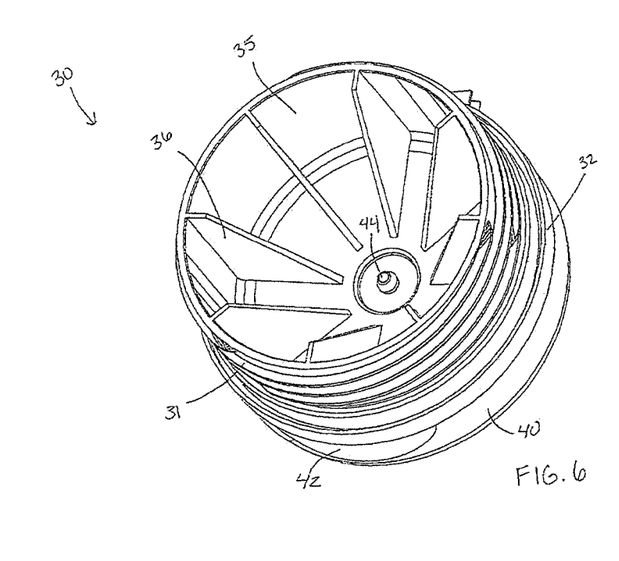
FIG. 6 depicts a top perspective view of the closure assembly of FIG. 5.

Referring now to FIGS. 5-6, closure (32) and cap (40) of closure assembly (30) are shown in more detail. As best seen in FIG. 5, closure (32) comprises threads (31) extending outwardly from neck (35) of closure (32) that correspond to internal threads (21) of tube (20) to selectively couple closure (32) with tube (20). Closure (32) further comprises ribs (36) extending inwardly within closure (32). Ribs (36) are thereby configured to strengthen closure (32) near threads (31) of closure (32) to reduce and/or prevent deformation of closure (32) and/or tube (20) near closure receiving portion (29) of tube (20). Accordingly, ribs (36) may help to maintain a tight seal between closure (32) and tube (20). In the present embodiment, ribs (36) are sloped such that the thickness of ribs (36) decreases as ribs (36) extend from near opening (39) through neck (35) of closure (32). FIG. 6 further shows closure (32) as including eight ribs (36). Other suitable configurations and number of ribs (36) will be apparent to one with ordinary skill in the art in view of the teachings herein.

As described above, closure (32) comprises an opening (39) on bottom surface (37) of closure (32) to dispense product from tube (20) through opening (39).

Bottom surface (37) of closure (32) is sloped toward opening (39) at about a 5 degree angle in the present embodiment to form a slightly conical shape, but other suitable configurations for bottom surface (37) will be apparent to one with ordinary skill in the art in view of the teachings herein. As best seen in FIG. 5, closure (32) includes interlocking features that correspond to the interlocking features of tube (20). These interlocking features include an inner annular flange (34), an annular recess (38), an interlocking annular protrusion (33) extending upwardly adjacent to annular recess (38), and an optional v-lock projection (53) projecting upwardly from within annular recess (FIG. 7B). Accordingly, interlocking features (34, 33, 38, 53) are configured to seal tube assembly (10) to thereby reduce and/or prevent water from entering tube assembly (10).

Figure 7:
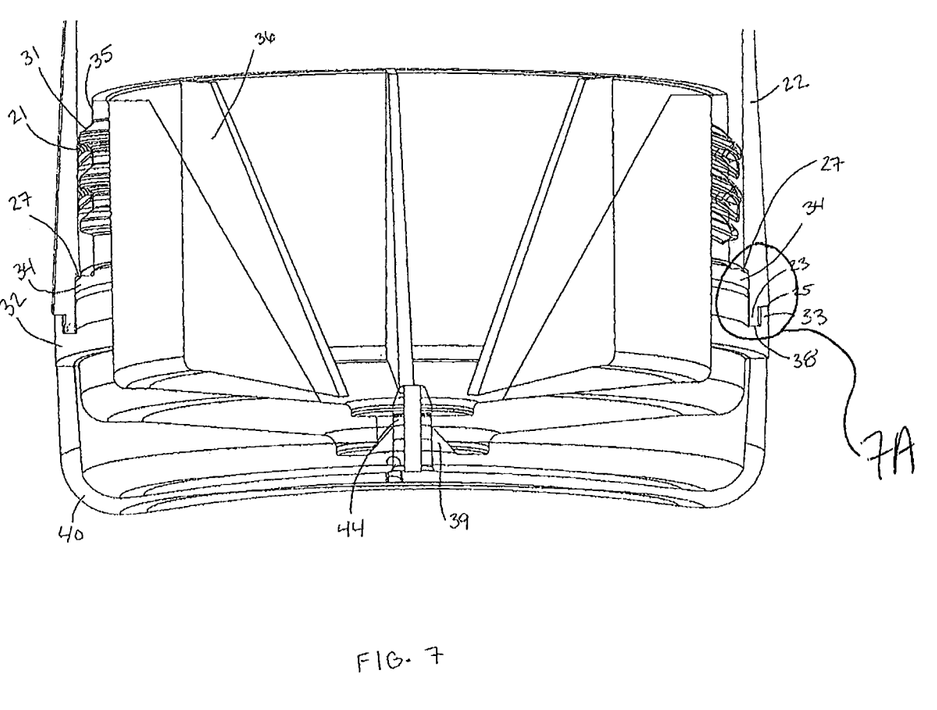
FIG. 7 depicts a cross-sectional view of the tube of FIG. 1 coupled with the closure assembly of FIG. 1.

For instance, closure assembly (30) is shown assembled with tube (20) in FIG. 7.

To assemble closure assembly (30) with tube (20) of the present embodiment, closure assembly (30) is aligned with opening (28) of tube (20) and neck (35) of closure (32) is inserted within opening (28) of tube (20). Closure assembly (30) and/or tube (20) is then rotated such that closure assembly (30) rotates relative to tube (20) to thread the external threads (31) of closure (32) into the internal threads (21) of tube (20). Internal threads (21) of tube (20) allow closure (32) to abut bottom end (26) of tube (20) and to align the exterior side of closure (32) with the exterior of side wall (22). Internal threads (21) of tube (20) thereby reduce and/or prevent water ingression within tube (20). Internal threads (21) of tube (20) may further allow for a greater number of closure designs and for lower profile closure heights while not sacrificing strength.

Figure 7A:
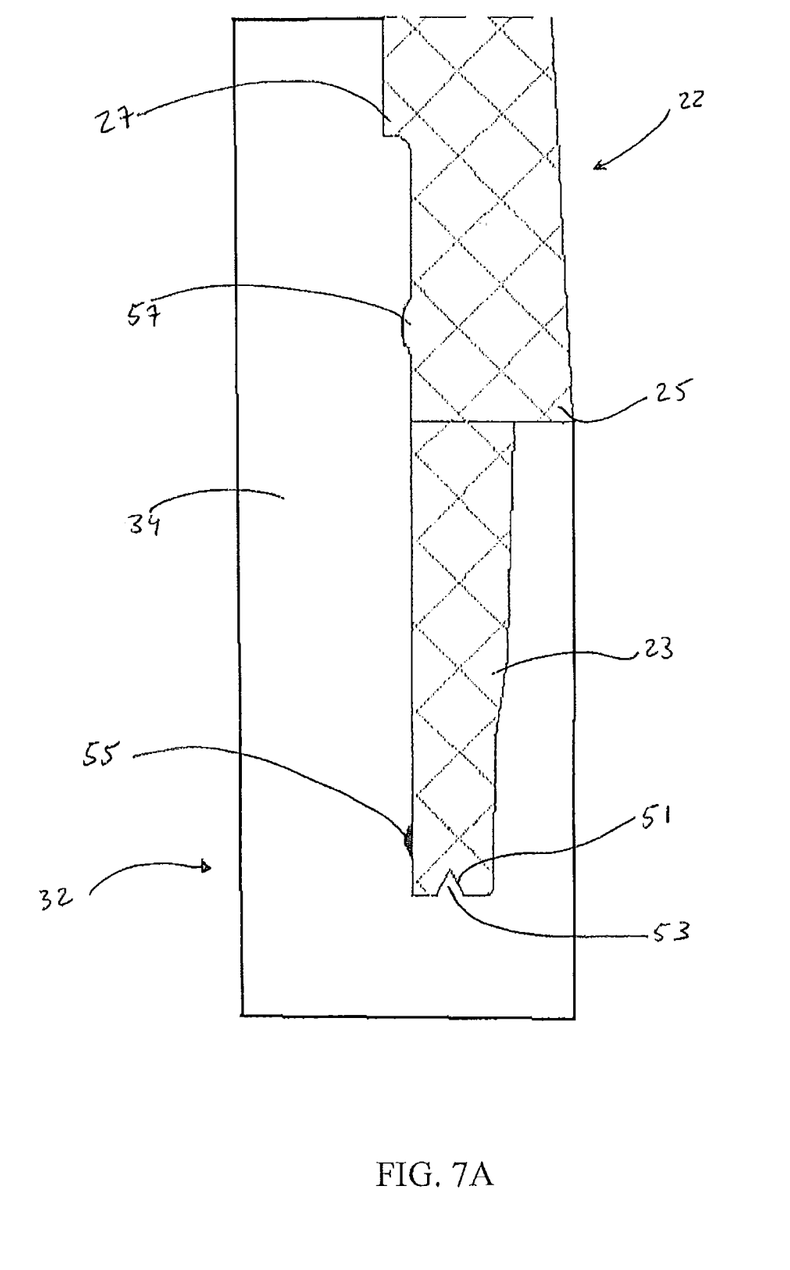
FIG. 7A is an enlarged view of an indicated portion of FIG. 7.
Figure 7B:
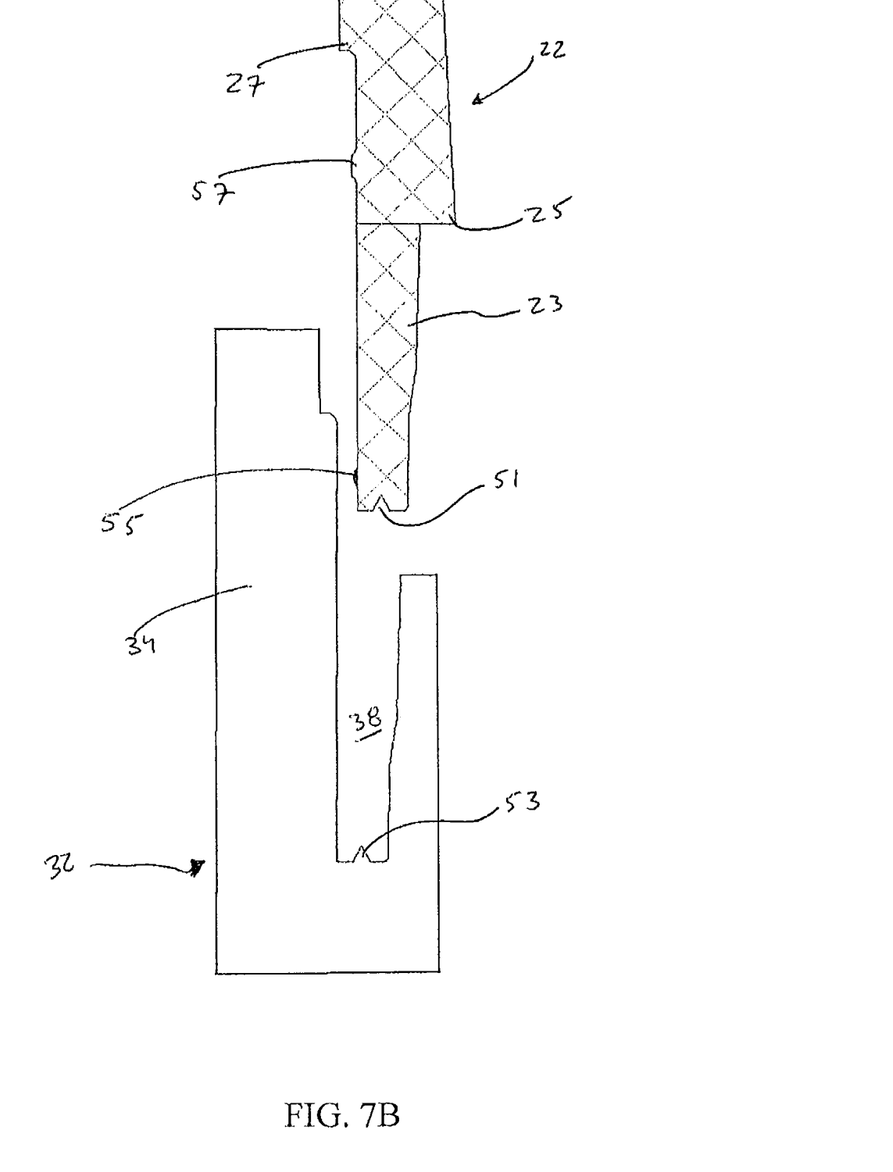
FIG. 7B is view similar to FIG. 7A with the closure assembly disengaged with the tube.

Closure (32) is thereby inserted into tube (20) until the interlocking features of closure (32) contact the interlocking features of tube (20). For instance, inner annular flange (34) of closure (32) abuts against inner annular flange (27) of tube (20), while annular protrusion (23) of tube (20) inserts within annular recess (38) of closure (32) and annular protrusion (33) of closure (32) abuts against outer annular flange (25) of tube (20). Further, as shown in FIGS. 7A and 7B, optional v-lock projection (53) of annular recess (38) may be received within v-lock recess (51) of tube (20). The tight press fit between v-lock recess (51) and v-lock projection (53) provide an additional seal to prevent water from entering tube assembly. In another embodiment of the present invention, annular recess (38) does not include v-lock projection (53) and the flat surface base of annular recess (38) fits firmly against v-lock recess (51). Similar to v-lock recess (51), when closure assembly (30) is disposed in tube (20), first annular bead (55) and second annular bead (57) encircle closure assembly (30). As closure assembly (30) is rotated to threadably engage closure assembly (30) with tube (20), the outer surface of closure assembly (30) presses against first annular bead (55) and second annular bead (57) to slightly deform each bead and further seal tube (20) in an o-ring style feature around the periphery of closure (32). Closure assembly (30) and tube (20) are thus configured to further reduce and/or prevent water from entering tube assembly (10). However, it should be noted that interlocking features (23, 25, 27, 33, 34, 38, 51, 53, 55, 57) of tube assembly (10) are merely optional. Still other configurations for assembling tube assembly (10) will be apparent to one with ordinary skill in the art in view of the teachings herein.

Once closure assembly (30) is coupled with tube (20), cap (40) of closure assembly (30) may be pivoted to an open position relative to closure (32) and tube (20) may be compressed to dispense product through opening (28) of tube (20) and through opening (39) of closure (32). Cap (40) may then be pivoted back toward closure (32) to a closed position to again prevent product from exiting through opening (39) of closure (32). Alternatively and/or additionally, closure (32) may be rotated in the opposing direction relative to tube (20) to selectively decouple closure assembly (30) from tube (20).

Figure 9:
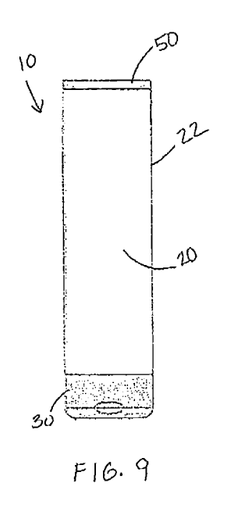
FIG. 9 depicts a front elevational view of the tube assembly of FIG. 1, showing the top of the tube sealed closed.

In addition to preventing water ingression within tube assembly (10), internal threads (21) of tube (20) may further allow for a straight-sided tube design. In general, tubes have been formed as cylindrical, meaning that the tubes have substantially the same diameter throughout the length of the tube. Accordingly, when the top end of the tube is sealed, the seal length is greater in the same proportion to the diameter of the tube itself such that the tube flares out during the sealing process. Alternatively, FIG. 4 shows that tube (20) can be formed in a conical shape with opening (28) extending through tube (20). Top end (26) of tube (20) is then sealed to prevent product from exiting through top end (26). Typically, top end (26) is sealed by flattening top end (26) along a width (50) of top end (26), as shown in FIG. 9. Once sealed, the conical shape of tube (20) gives the appearance of a substantially straight-sided tube from a front and back view of tube (20). This may provide a visual appeal for consumers.

Figure 8:
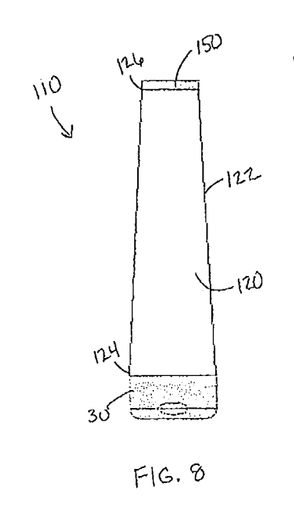
FIG. 8 depicts a front elevational view of another tube assembly.
Figure 10:
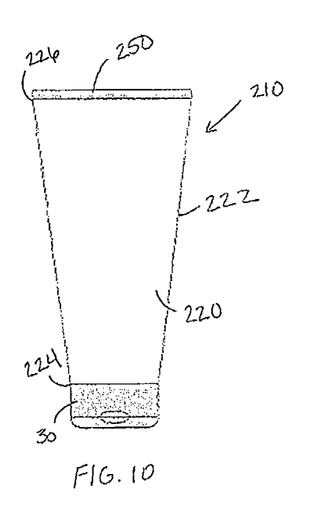
FIG. 10 depicts a front elevational view of another tube assembly.

Still other configurations for tube (20) may be used. For instance, FIG. 8 shows another tube assembly (110) that is similar to tube assembly (10), except that tube (120) of tube assembly (110) forms more of a conical shape than tube (20) of tube assembly (10). In particular, side wall (122) of tube (120) still forms a conical shape with a top end (126) that has a smaller width than bottom end (124) of tube (120) when tube (120) is sealed along a width (150) of top end (126). Alternatively, FIG. 10 shows a tube assembly (210) that is similar to tube assembly (10), except that tube (220) of tube assembly (210) forms an inverted conical shape. In particular, side wall (222) of tube (220) has a top end (226) that has a wider width than bottom end (224) of tube (220) when tube (220) is sealed along a width (250) of top end (226). Still other suitable configurations for tube assembly (10, 110, 210) will be apparent to one with ordinary skill in the art in view of the teachings herein. For instance, top end (26, 126, 226) may be closed and/or sealed with a flat top surface to allow tube assembly (10, 110, 210) to stand upright on top end (26, 126, 226).

Still other configurations for the engagement between tube (20) and closure assembly (30) may be used. The threaded engagement between tube (20) and closure assembly (30) may be configured to include symmetrical threads, whereby the pitch angles on each side of the threads (21) of tube (20) and the corresponding threads (31) of closure assembly (30) are essentially identical. Conversely, the threaded engagement between tube (20) and closure assembly (30) may be configured to include asymmetrical threads, whereby the pitch angles on each side of the threads are different.

As shown in FIG. 5, threads (31) of closure assembly (30) may include an upper surface (31a) and a lower surface (31b). In an embodiment of the present invention, upper surface (31a) and lower surface (31b) may be oriented at the same angle with respect to an imaginary horizontal line. As such, threads (31) may be symmetrical. For example, both upper surface (31a) and lower surface (31b) may be set at a 30° angle with respect to imaginary horizontal line. In another embodiment of the present invention, upper surface (31a) and lower surface (31b) may be set at different angles. As such, threads (31) may be asymmetrical. For example, upper surface (31a) may be set at a 43° angle while lower surface may be set at a 17° angle with respect to the imaginary horizontal line. It follows that the matching surfaces of threads (21) of tube (20) include an upper surface angled complementary with upper surface (31a) and a lower surface angled complementary with lower surface (31b). The matching angled surfaces of threads (21) and (31)

facilitate the threaded engagement between tube (20) and closure assembly (30). The asymmetrical thread angles may act to further seal tube assembly (10).

It should be understood that any one or more of the teachings, expressions, embodiments, examples, etc. disclosed herein may be combined with any one or more of the other teachings, expressions, embodiments, examples, etc. that are disclosed herein. The teachings, expressions, embodiments, examples, etc. disclosed herein should therefore not be viewed in isolation relative to each other. Various suitable ways in which numerous aspects of the present disclosure may be combined will be readily apparent to those of ordinary skill in the art in view of the teachings disclosed herein. Such modifications and variations are intended to be included within the scope of both the present disclosure and the claims.

Having shown and described various embodiments of the present disclosure, further adaptations of the methods and systems described herein may be accomplished by appropriate modifications by one of ordinary skill in the art without departing from the scope of the present disclosure. Several of such potential modifications have been mentioned, and others will be apparent to those skilled in the art. For instance, examples, embodiments, geometrics, materials, dimensions, ratios, steps, and the like discussed above are illustrative and are not required. Accordingly, the scope of the present disclosure should be considered in terms of the following claims and is understood not to be limited to the details of structure and operation shown and described in the specification and drawings.

What is claimed is:

1. A tube assembly for dispensing product comprising:
   a tube comprising:
      a closed first end,
      an open second end opposing the closed first end,
      a side wall extending between the closed first end and the open second end, wherein the side wall and the closed first end define an interior portion configured to hold product, and
      internal threads extending inwardly from the side wall adjacent to the open second end; and
   a closure assembly selectively couplable with the open second end of the tube, wherein the closure assembly comprises external threads extending outwardly from the closure assembly that correspond to the internal threads of the tube;
   wherein the tube assembly comprises interlocking features configured to prevent fluid from entering the tube assembly between the tube and the closure assembly when the closure assembly is coupled with the open second end of the tube, wherein the interlocking features comprise:
      an inner annular flange positioned about an interior surface of the side wall of the tube between the open second end and the internal threads, wherein the inner annular flange is configured to abut an inner annular flange of the closure assembly,
      an outer annular flange positioned about an exterior surface of the side wall of the tube between the open second end and the internal threads such that the outer annular flange is positioned closer to the open second end than the inner annular flange, wherein the outer annular flange is configured to abut an annular protrusion of the closure assembly, and
      an interlocking annular protrusion extending from the open second end of the tube, wherein the interlocking annular protrusion is configured to insert within an annular recess of the closure assembly.

2. The tube assembly of claim 1, wherein the interlocking annular protrusion comprises at least one annular bead extending inwardly from the interlocking annular protrusion.

3. The tube assembly of claim 1, wherein the closure assembly comprises an opening, and wherein the tube is flexible such that the tube is configured to be squeezed to dispense product through the opening.

4. The tube assembly of claim 1, wherein the interlocking annular protrusion comprises:
   a v-lock recess defined by the tube at a distal end of the interlocking annular protrusion, wherein the v-lock recess is configured to abut the closure assembly when the closure assembly is coupled with the open second end of the tube.

5. The tube assembly of claim 1, wherein the closure assembly comprises a flat surface such that the tube assembly is configured to stand upright on the closure assembly.

6. The tube assembly of claim 1, wherein a select one or both of the internal threads and the external threads are asymmetrical.

7. The tube assembly of claim 1, wherein the tube defines substantially straight sides when viewed from the front.

8. The tube assembly of claim 1, wherein the side wall of the tube increases in thickness near the open second end of the tube.

9. The tube assembly of claim 1, wherein the tube is injection molded as a single piece.

10. The tube assembly of claim 1, further comprising an annular bead located proximate the inner annular flange.

11. The tube assembly of claim 2, wherein the at least one annular bead are configured to slightly deform in an o-ring style feature around a periphery of the closure assembly when an outer surface of the closure assembly presses against the at least one annular bead upon rotation of the closure assembly to threadably engage the closure assembly with the tube.

12. The tube assembly of claim 4, wherein the annular recess of the closure assembly comprises a v-lock projection extending upwardly from within the annular recess, wherein the v-lock projection is configured to be received within the v-lock recess of the interlocking annular protrusion when the closure assembly is coupled with the open second end of the tube.

13. The tube assembly of claim 3, wherein the closure assembly comprises a cap, wherein the cap is movable to selectively close the opening.

14. The tube assembly of claim 13, wherein the cap is coupled with the closure assembly by a hinge such that the cap is pivotable relative to the closure assembly.

15. The tube assembly of claim 1, wherein the annular protrusion of the closure assembly defines an outer diameter of the closure assembly that is consistent from the annular protrusion to a free end of the closure assembly.

16. The tube assembly of claim 1, wherein a width of the tube decreases from the open second end to the first end to form a conical shape when the first end is in an open configuration and wherein the width of the tube is consistent from the open second end to the first end when the first end is in a closed configuration.

17. The tube assembly of claim 1, wherein the closure assembly comprises a cap to selectively close the open second end of the tube, wherein an outer diameter of the cap corresponds to the outer diameter of the annular protrusion of the closure assembly.

\* \* \* \* \*